P. GABLE.
Sled-Brakes.
No. 142,623.  Patented September 9, 1873.
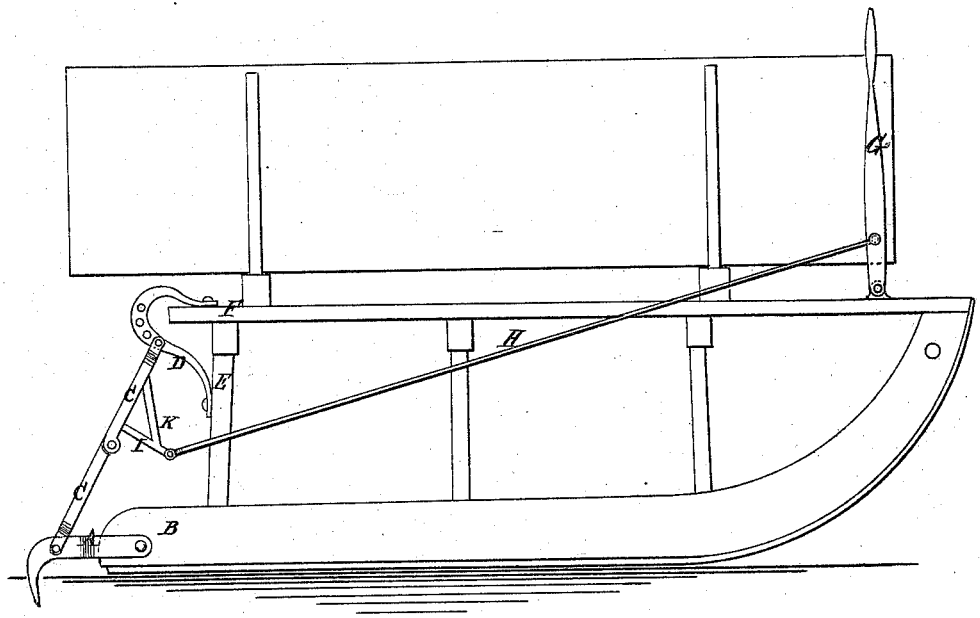

UNITED STATES PATENT OFFICE.

PETER GABLE, OF ELIZABETH, ILLINOIS.

IMPROVEMENT IN SLED-BRAKES.

Specification forming part of Letters Patent No. 142,623, dated September 9, 1873; application filed March 1, 1873.

*To all whom it may concern:*

Be it known that I, PETER GABLE, of Elizabeth, in the county of Jo Daviess and State of Illinois, have invented a new and Improved Sled-Brake, of which the following is a specification:

My invention is an improvement in the class of sleigh or sled brakes in which a dog or claw is pivoted to the runner, and so connected with a system of levers as to be caused to take into the snow or ice at the will of the driver. My invention consists in the arrangement of a toggle-lever having a rule-joint and projecting arm or brace for attachment of the operating-rod, as hereinafter described, whereby a dog pivoted to the runner may be caused to take into the snow, and is held in that position without continuance of the force necessary to apply at the outset.

The drawing is a side elevation of a sled with my improved brake attachment.

A represents the hook-shaped dog, which is pivoted to the rear end of one of the runners B, so that the hook-point will drag when not lifted up. Near the rear end said dog is pivoted to the lower member of a pair of toggle-jointed bars, C, of which the upper one is suspended from a curved bar, D, which is attached to the rave F and one of the posts E, and has a series of holes for the connecting-bolt, by which to connect the toggle-jointed bars higher or lower, according to the power required for the load. The bars are connected by a rule-joint, so that when the levers are straight or in alignment the dog will be prevented from rising until the lever G is operated for the purpose. As brakes are ordinarily arranged the dog requires to be held down by continuous application of force by means of a hand-lever. The upper bar C is connected with the brake-lever G by the rod H, and the arm I, and brace K, so that by pulling the bars C forward to the right line in which they are represented in the drawing, or toward it, the hook will be forced upon the ground with great power, and by pushing them back it will be lifted off the ground.

The lever is brought to a vertical line, or thereabout, when the hook is hard down, but falls back when the power is taken off, and holds the hook up by its weight.

It will be seen that, as the levers $c\ c$ approximate alignment, the power of the brake—*i. e.*, the force with which the dog takes into the snow—is proportionally increased, without any increase in the force applied to the hand-lever G. The advantage of this is obvious.

The arm I is used for connecting the rod H, to have the necessary leverage when the jointed bars C are thrown back, by which the upper one is thrown up so nearly horizontal, in consequence of being suspended so far in advance of the connection of them with the hook, that the leverage would be very slight without it; but, in case the sled is so constructed that the point of connection of the jointed bars C with the bar D would be nearly over the point of connection with the hook, this would not be needed.

Having thus described my invention, I claim as new and desire to secure by Letters Patent—

In combination with a dog, A, pivoted to the runner of a sled or sleigh, the toggle-levers $c\ c$, pivoted to a support, D, connected by a rule-joint, and one of them provided with an arm, I, the rod H, and lever G, substantially as and for the purpose specified.

PETER GABLE.

Witnesses:
THOMAS B. BRAY,
G. H. GREEN.